US012122065B2

(12) United States Patent
Bradshaw et al.

(10) Patent No.: US 12,122,065 B2
(45) Date of Patent: Oct. 22, 2024

(54) TRUNCATING THE DISTRIBUTION OF MODULUS PROPERTIES IN NATURAL POPULATIONS OF WOOD

(71) Applicant: InventWood Inc., College Park, MD (US)

(72) Inventors: Allan Bradshaw, Seattle, WA (US); Jack G. Winterowd, Puyallup, WA (US)

(73) Assignee: InventWood Inc., College Park, MD (US)

(*) Notice: Subject to any disclaimer, the term of this patent is extended or adjusted under 35 U.S.C. 154(b) by 0 days.

(21) Appl. No.: 18/368,472

(22) Filed: Sep. 14, 2023

(65) Prior Publication Data

US 2024/0066748 A1 Feb. 29, 2024

Related U.S. Application Data

(63) Continuation of application No. PCT/US2023/030948, filed on Aug. 23, 2023.

(Continued)

(51) Int. Cl.

*B27K 3/02* (2006.01)
*B27D 3/00* (2006.01)

(Continued)

(52) U.S. Cl.

CPC ................ *B27K 3/025* (2013.01); *B27D 3/00* (2013.01); *B27K 3/18* (2013.01); *B27K 3/42* (2013.01);

(Continued)

(58) Field of Classification Search

None

See application file for complete search history.

(56) References Cited

U.S. PATENT DOCUMENTS 5,652,065 A * 7/1997 Park ........................ B32B 21/08 428/218
6,001,452 A * 12/1999 Bassett ..................... B27B 1/00 428/110

(Continued)

FOREIGN PATENT DOCUMENTS

CN 201220441 4/2009
CN 201220441 Y * 4/2009

(Continued)

OTHER PUBLICATIONS

International Search Report and Written Opinion for PCT/US2023/030948, mailed Jan. 22, 2024.

*Primary Examiner* — Michael P. Rodriguez

(74) *Attorney, Agent, or Firm* — Klarquist Sparkman, LLP

(57) ABSTRACT

This disclosure is directed to methods of separating wood veneer material by property measurements, and thereafter improving the properties of veneer material with property values lower than a target threshold value, until those materials meet or exceed that threshold values. In some aspects of the disclosure, veneer materials are prepared, non-destructively measured, and separated into passing and failing material collections. The failing material collection may then be treated to improve the density and flexural modulus of the material therein. Also disclosed herein are products and materials incorporating the treated veneer materials according to the disclosed methods.

28 Claims, 1 Drawing Sheet

Related U.S. Application Data

(60) Provisional application No. 63/400,332, filed on Aug. 23, 2022.

(51) Int. Cl.
*B27K 3/18* (2006.01)
*B27K 3/42* (2006.01)

(52) U.S. Cl.
CPC ...... *B27K 2200/30* (2013.01); *B27K 2240/70* (2013.01)

(56) References Cited

U.S. PATENT DOCUMENTS

| | | | | |
|---|---|---|---|---|
| 11,130,256 | B2 | 9/2021 | Hu et al. | |
| 11,440,214 | B2 | 9/2022 | Hu et al. | |
| 2004/0108017 | A1 | 6/2004 | Abe et al. | |
| 2005/0277733 | A1* | 12/2005 | Wescott | C08H 1/02 524/593 |
| 2015/0258760 | A1* | 9/2015 | Renneckar | B32B 7/04 156/309.9 |
| 2015/0259568 | A1* | 9/2015 | Schwalm | C08G 18/8125 427/508 |
| 2020/0238565 | A1 | 7/2020 | Hu et al. | |
| 2021/0031401 | A1 | 2/2021 | Pan | |
| 2021/0122902 | A1 | 4/2021 | Hu et al. | |
| 2022/0412002 | A1 | 12/2022 | Hu et al. | |
| 2023/0160141 | A1 | 5/2023 | Hu et al. | |
| 2023/0203311 | A1 | 6/2023 | Hu et al. | |
| 2023/0234258 | A1 | 7/2023 | Hu et al. | |
| 2023/0256645 | A1 | 8/2023 | Hu et al. | |
| 2023/0340728 | A1 | 10/2023 | Hu et al. | |
| 2024/0083067 | A1 | 3/2024 | Hu et al. | |

FOREIGN PATENT DOCUMENTS

| | | | | |
|---|---|---|---|---|
| WO | WO2010/082137 | | 7/2010 | |
| WO | WO-2010082137 | A1 * | 7/2010 | B27N 1/00 |
| WO | WO2018/143004 | | 8/2018 | |
| WO | WO-2018143004 | A1 * | 8/2018 | B27D 1/04 |
| WO | WO2022/251595 | A1 | 12/2022 | |
| WO | WO2023/224971 | A1 | 11/2023 | |
| WO | WO2023/239749 | A1 | 12/2023 | |

* cited by examiner

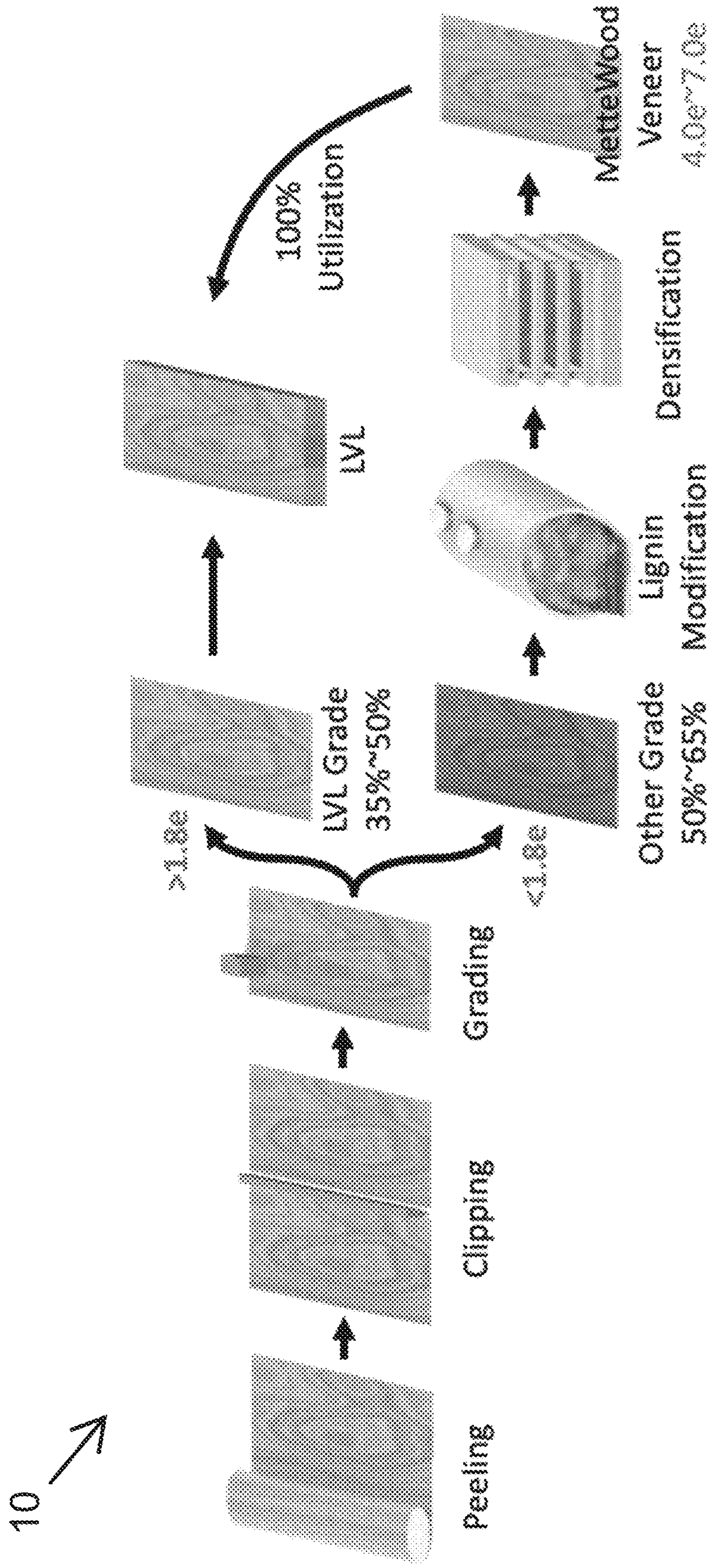
10
Peeling
Clipping
Grading
>1.8e
<1.8e
LVL Grade
35%~50%
Other Grade
50%~65%
LVL
Lignin
Modification
Densification
MetteWood
Veneer
4.0e~7.0e
100%
Utilization

TRUNCATING THE DISTRIBUTION OF MODULUS PROPERTIES IN NATURAL POPULATIONS OF WOOD

CROSS REFERENCE TO RELATED APPLICATION

This application is a U.S. bypass continuation application of International Application No. PCT/US2023/030948, filed Aug. 23, 2023, which in turn claims the benefit of U.S. Provisional Patent Application No. 63/400,332, filed on Aug. 23, 2022, which are incorporated by reference herein in their entirety.

ACKNOWLEDGMENT OF GOVERNMENT SUPPORT

This invention was made with government support under DE-AR0001025 awarded by the U.S. Department of Energy. The government has certain rights in the invention.

FIELD

The present disclosure relates to methods for improving the distribution of mechanical properties of wood veneer material and veneer-based strand material. Also disclosed are products obtained therefrom.

BACKGROUND

Wood products can be categorized as structural or non-structural. Structural wood products include softwood lumber, softwood glulam, softwood plywood, laminated veneer lumber (LVL), I-joists, parallel strand lumber (PSL), laminated strand lumber (LSL), oriented strandboard (OSB), and softwood plywood. Non-structural wood products include particleboard, fiberboard, hardboard, and hardwood plywood. Structural wood products are distinguished based on their ability to support sustained loads in buildings and are predominantly directed towards vertical members, horizontal members, diagonal members, and also flooring, wall sheathing and roof sheathing when used in residential and commercial buildings.

The strength and modulus properties in wood-based composites are highly dependent upon the strength and modulus of the wooden elements that constitute the composite. Wooden elements used in the production of structural composites include veneer and strands. However, in most cases, a significant percentage of veneer and strands generated at a production site has insufficient mechanical properties for certain structural wood applications. There is, accordingly, a need for methods of improving the natural properties of this fraction of otherwise unsuitable material, and for products using material with such improved properties.

There is, accordingly, a need for methods of improving the natural properties of this fraction of otherwise unsuitable material, and for products using material with such improved properties.

SUMMARY

Disclosed herein are methods for converting a population of veneer sheets that is initially comprised of veneer sheets with a mixture of unacceptable and acceptable bending modulus values, to a modified population of veneer sheets wherein all, or most, of the sheets have an acceptable bending modulus. The method includes a first step of non-destructively measuring the stiffness of the veneer sheets within the initial population. In a second step, the initial population of veneer sheets is sorted into a first group with bending modulus values that exceed a targeted threshold value, and a second group with bending modulus values that are less than the targeted threshold value. In a third step, the second group of wooden elements are subjected to a process that increases the bending modulus values such that the targeted bending modulus threshold value is exceeded.

Certain examples concern A method comprising subjecting a set of wooden veneer sections to non-destructive parallel-to-grain direction bending modulus measurements. The method further comprises sorting the veneer sections into a first group comprising the veneer sections having a modulus value above a predetermined threshold value and a second group comprising the veneer sections having a modulus value below the threshold value. The method further comprises subjecting the second group of veneer sections to a process that increases the parallel-to-grain direction bending modulus value to that which is greater than the predetermined threshold value.

Certain examples further comprise a lignin degradation step and a compression step.

Certain examples further comprise infiltrating the veneer with a loading solution to produce a treated veneer.

Certain examples further comprise infiltrating the treated veneer with a water blocking agent.

Certain examples further comprise compressing the treated veneer along a thickness axis until a density of the treated veneer is in a first density range.

Certain examples further comprise reducing a moisture content of the treated veneer to a range of about 1-10%.

Certain examples further comprise compressing the treated veneer along the thickness axis until the density of the treated veneer is in a second density range.

Certain examples concern a method of improving mechanical properties of wood veneer. The method comprises infiltrating the wood veneer with a loading solution to produce a treated veneer and partially drying the treated veneer a first time. The method also comprises infiltrating the treated veneer with a water blocking agent and partially drying the treated veneer a second time. The method also comprises holding the treated veneer at a temperature ranging from 20-50° C. and at a pressure ranging from 100-1200 psi until a density of the treated veneer ranges from 900-1,100 kg/m3 without fully curing the water blocking agent and drying the treated veneer until a moisture content ranges from between 1% and 10%.

The foregoing and other objects, features, and advantages of the present disclosure will become more apparent from the following detailed description, which proceeds with reference to the accompanying FIGURES.

BRIEF DESCRIPTION OF THE DRAWINGS

FIG. 1 is a schematic diagram illustrating a process for improving the material properties of rejected veneer and filament material according to one example.

DETAILED DESCRIPTION

Definition of Terms

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly indicates otherwise. The term "or" refers to a single element of stated alternative elements or a combination of two or more elements unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods, as known to those persons of ordinary skill in the art. When directly and explicitly distinguishing embodiments from discussed prior art, the embodiment numbers are not approximate values unless the word "about" is recited. Furthermore, not all alternatives recited herein are equivalents.

The features described herein with regard to any example can be combined with other features described in any one or more of the examples, unless otherwise stated.

To facilitate review of the various aspects of the disclosure, the following explanations of specific terms are provided:

Cure: For the purposes of this disclosure, the term "cure", when used in relation to a monomer, indicates that the monomers have undergone multiple condensation or addition reactions and the resulting reaction products are solid molecules that are insoluble in water.

Laminated Veneer Lumber: For the purposes of this disclosure, the term laminated veneer lumber (or LVL), refers to a structural wood-based composite comprised of multiple layers of veneer, wherein the veneer layers are bonded together by use of a structural adhesive, and the grain angle associated with each of the veneer layers is oriented in the same direction within the composite.

Laminated strand lumber: For the purposes of this disclosure, the term laminated strand lumber (or LSL), refers to a structural wood-based composite comprised of a multitude of long strands, wherein the strands have a length of about 6-15 inches and are bonded together by use of a structural adhesive, wherein the grain angle associated with each of the strands is approximately oriented in the length direction of the strand, and the orientation of all of the strands is in approximately the same direction within the composite.

Parallel Strand Lumber: For the purposes of this disclosure, the term parallel strand lumber (or PSL), refers to a structural wood-based composite comprised of a multitude of long strands, wherein the strands have a length of about 30-100 inches and are bonded together by use of a structural adhesive, wherein the grain angle associated with each of the strands is approximately oriented in the length direction of the strand, and the orientation of all of the strands is in approximately the same direction within the composite.

Parallel-to-Grain Direction Bending Modulus: For the purposes of this disclosure, the term "parallel-to-grain direction bending modulus", refers to a calculated modulus value wherein the input values for the calculation are determined from a flexural test method that involves a rectangular-shaped wood-based composite with a predominant grain direction that is associated with a length axis; wherein the composite has a width value (w) and thickness value (t); wherein the composite is placed on top of two support rods that are separated by a given distance and this distance has a particular span value (span); wherein a downward force (F) is applied to the composite at the center point of the span and parallel to the thickness of the composite and the applied force results in a downward deflection distance (d) at the center point of the composite and the slope of the F/d relationship is determined; wherein the parallel-to-grain direction bending modulus is calculated as the product of ($slope \times span^3$) divided by the product of ($4 \times width \times thickness^3$).

Oriented Strand Board: For the purposes of this disclosure, the term oriented strand board (or OSB), refers to a structural wood-based composite comprised of a multitude of short strands, wherein the strands have a length of about 1-6 inches, a width of about 0.5-2.0 inches, and a thickness of about 0.015-0.050 inches, and are bonded together by use of a structural adhesive, wherein the composite has top and bottom major surfaces and three or more layers between the top and bottom major surfaces, wherein the grain angle associated with each of the strands is approximately oriented in the length direction of the strand, and the predominant orientation of the length of the strands in the outermost layers (top and bottom) is in a machine-direction, while the predominant orientation of the length of the strands in one or more of the middle layers (between the top and bottom layers) is in a cross-direction or has random orientation, wherein the machine-direction of the composite is offset from the cross-direction of the composite by 90 degrees.

Introduction to the Disclosed Technology

Structural wood composites may be fabricated from natural wood products such as veneer and strands. The properties of these structural composites are heavily dependent on the properties of the materials that go into such composites. Key engineering properties for structural wood products include bending strength and bending modulus. An array of standardized test methods exists for assessing bending strength and bending modulus in structural wood products. Bending strength values are typically expressed as modulus of rupture values, which reflect the influence of section shape and size, as well as the intrinsic strength of the wooden elements and adhesive on the force required to break a member in bending mode.

Veneer can be made by debarking logs and then soaking them in heated water to ensure that the wood tissue is wet and soft. The wet logs are then cut into shorter segments (usually about 100 inches long), called bolts. The bolts are then peeled on lathes to generate long strips of veneer that usually have a thickness ranging from about 0.100" to 0.250". The strips of veneer are then clipped into sections (frequently about 100 inches parallel to the wood grain by about 50 inches perpendicular to the grain direction). The wet veneer sections are then dried and graded on a visual basis. In some cases, the veneer can also be characterized for modulus by use of various non-destructive evaluation methods, such as x-ray and ultrasound. Once made, the veneer can be used in the production of plywood, LVL, PSL, or other veneer-based composite products.

Wooden strands can be made in a process that also begins by debarking logs and then soaking them in heated water to ensure that the wood tissue is wet and soft. The wet logs are cut into bolts, which are then processed in stranding machines. In this stage, the bolts are pressed laterally into a rotating set of blades that cuts the bolt into thousands of strands. Ideally, each strand has a length of about 2-6 inches, a width of about 0.5-2.0 inches, and a thickness of about 0.015-0.50 inches. The grain direction of the wood in each strand is approximately parallel to the length axis of the strand. The strand mixture can be dried and then subjected to screening to remove small particles (dust and fines). Strands of this sort can be used in the production of OSB. Alternatively, strands having a length of about 6-15 inches can be used in the production of LSL. In some examples, strands having a length of about 8 feet can be cut from veneer and then used to make PSL.

The strength and modulus of these wooden elements is known to be influenced by the part of the log that was used to obtain the wooden element. Specifically, logs are derived from tree stems. The strongest and stiffest wood in the stem is generally located at the base of the stem and in the outer layer of the stem. Isolating wooden elements from parts of the stem that are towards the center and/or towards the top of the stem yields wooden elements with less strength and stiffness. Strength and stiffness can also be influenced by the age of the tree at the time of harvest. Older trees tend to yield wooden elements that are stronger and stiffer. Interestingly, the strength and stiffness of the wood can also be influenced by how fast the tree was grown. Trees that were grown more slowly tend to yield wooden elements that are stronger and stiffer. Of course, wood species and sub-species type can also impact the strength and stiffness of the wood. As plantation-grown trees and younger forests have become more common, the strength and stiffness of wood in North America have both generally declined.

Based on the above information, it is clear that wooden elements produced at a given production facility will have a distribution of strength and stiffness properties. Traditionally, forest products companies tend to source logs from forested land that is located within about 200-400 miles of production facilities that convert the logs into products. Thus, production facilities generally have access to a limited number of logs per year (without incurring significant transportation costs). Furthermore, the available logs yield wooden elements (veneer and/or strands) with a distribution of strength and stiffness values.

For some wood-based composite production facilities, the distribution of properties for the wooden elements can result in a condition in which not all of the wooden elements can be used in the manufacturing process. This can be especially true for veneer-based composites, including LVL, which is commonly used in applications that have relatively high bending strength and stiffness requirements.

LVL is generally manufactured by applying liquid phenolic bonding resin to one or two major surfaces of sheets of veneer by use of roll-coating, spraying, flood coating, or other application methods. The adhesive-treated veneer sheets are then incorporated in a staggered fashion into a mat that is essentially continuous in the machine direction. The grain direction of the veneer is also aligned in the machine direction of the mat. The mat can include about 6-16 layers of veneer sheets in any particular spot depending on the thickness of the veneer and the target thickness of the final LVL product. The mat is then subjected to a hot-press. The top and bottom platens in the press can have a temperature of about 330-400° F. Pressure exerted on the mat can be in the range of about 100-200 psi. Press time can range from about 200-700 seconds depending on the target thickness of the final LVL product, the platen temperature, and other parameters. The LVL exits the press as a continuous ribbon that is trimmed on the edges, cut to length, and ripped longitudinally depending on its intended application. A significant amount of LVL is commercially used as flange material for I-joists.

Wooden I-joists are generally used as horizontal members in subfloors in both residential and commercial construction. I-joists are a competitive option to solid-sawn lumber joists. I-joists are usually connected to rimboard along the perimeter of the building and span between foundation elements on the ground floor. Alternatively, I-joists can span between walls on upper floor levels. I-joists can be spaced about 16-24 inches apart and act as a substrate and supporting member for structural subfloor panels. Thus, the I-joists must be very stiff. In fact, I-joists are designed to be exceptionally stiff and lightweight.

I-joists are made by attaching flange elements to the top and bottom edges of a web element. The web element is often OSB with a thickness of 0.375 inches or 0.438 inches or even 0.500 inches. The height of the web can be in the range of about 6-14 inches. The length of the web can be about 8-60 feet. Flange elements can have a width that ranges between about 1.375-2.25 inches. The height of the flange elements can range between about 0.75-2.00 inches. The flange elements are generally connected to the top and bottom edges of the web by use of profiled joints and structural adhesives (resorcinol-based or isocyanates). LVL is a preferred flange material in I-joists.

The stiffness of the LVL has a dominant impact on the stiffness of the I-joist. Stiffer I-joists can result in less floor movement and vibration (China rattling) when occupants walk on a floor in a home or commercial building. Stiffer I-joists can allow the builder to space the joists further apart in a floor system while maintaining the required structural integrity of the floor, which reduces the cost of the building. Stiffer LVL can also allow the height of the I-joist to be shorter, which helps to reduce dead-space in a building between floors and reduces the overall cost of the building. Thus, there is significant commercial motivation to utilize veneer with maximum stiffness in the production of LVL and I-joists.

For a given veneer thickness value, the stiffness of the veneer is directly proportional to the modulus of the veneer. Thus, the modulus value is a critical indicator of the suitability of a given sheet of veneer for an LVL application.

Unfortunately, in most cases, veneer generated at a production site includes a significant percentage that has insufficient stiffness (or modulus) for an LVL and I-joist application. As an example, veneer generated at a particular production site might have bending modulus values that range from about $1.5\times10^6$-$2.3\times10^6$ psi. The modulus distribution might be approximately normal with a standard deviation of about $2.0\times10^5$ psi. Furthermore, the plant might be making LVL that requires a modulus of $2.0\times10^6$ psi. By deliberately making the LVL with the stiffest veneer in the outermost layers and using less stiff veneer in the middle layers, the plant might be able to utilize the portion of the veneer having a modulus between about $1.8\times10^6$-$2.3\times10^6$ psi. Thus, the least-stiff portion of the veneer with a modulus of $1.5\times10^6$-$1.8\times10^6$ psi would not be suitable for LVL production. In this example, the non-usable veneer would constitute about 30.9% of the total veneer that was generated at the plant. To the extent that the veneer is expensive to produce and the market price for the LVL is high, there is a substantial financial opportunity associated with upgrading the least-stiff veneer such that the modulus of this veneer is elevated to a value greater than about $2.0\times10^6$.

Aspects of the Disclosed Technology

Disclosed herein are methods for identifying the properties of veneer and strand materials, and for improving the properties of lower-grade veneer and strand materials. Also disclosed herein are example composites utilizing the improved veneer and strand materials.

There are multiple methods for rapidly characterizing veneer sheets for bending modulus. In one example method 10, illustrated in FIG. 1 veneer is separated from a log or bolt by peeling. The peeled veneer is then clipped into sections as shown, for example, with a blade.

Sections of veneer produced at a manufacturing site can be non-destructively measured for bending modulus in the parallel-to-grain-direction. An example non-destructive parallel-to-grain direction bending modulus value testing method is processing the veneer sections through a machine that supports the veneer at two locations with rolls, such that a given veneer sheet spans the two rolls and the span has a particular length. A third roll can then be used to apply a downward vertical load onto the veneer at a location that is equidistant between the two supporting rolls. The applied force from the third roll induces modest levels of deflection in the veneer. In a continuous process, multiple sets of load and deflection data can be collected for an individual sheet of veneer. The average force of the load, the average deflection, the span distance, and the average thickness and width of the veneer can all be used to calculate a representative modulus value for the veneer sheet. In practice, a single veneer sheet can be characterized for bending modulus within 2-3 seconds using this method. In some examples, sheets of veneer can be processed through machines that measure the speed of sound propagation through the veneer. The speed of the sound can be correlated to the bending modulus in a manner that can yield reasonable predictions, especially if the ultrasound information is combined with the density of the veneer, which can be determined in an automated manner using an x-ray scanner.

With continued reference to FIG. 1, upon determining the bending modulus value for a sheet of veneer, the veneer sheet can immediately be sorted based on whether the measured or estimated bending modulus value exceeds a predetermined threshold value. In this manner all of the veneer sheets produced at a site can be sorted into initial “accept” or “reject” groups. In some examples, veneer sheets can be marked with red or blue stripes, or some other visual marking system based upon whether the measured bending modulus exceeded the predetermined threshold value. The marked sheets can then be sorted into accept and reject groups at a later stage of the process. In some examples, only a portion of the veneer sheets generated at a production site might be subjected to the bending modulus measurements and sorting process. In some examples, veneer with insufficient bending modulus might be shipped to a converting facility from multiple veneer manufacturing plants.

Veneer that has been designated as having insufficient bending modulus can thereafter be upgraded in a process that yields parallel-to-grain direction bending modulus values that exceed the predetermined threshold value. The disclosed modification process can be conducted in multiple steps.

In a first step, sections of veneer are modified by infiltrating the veneer with a loading solution. In some examples, lignin in the veneer is partially degraded by the loading solution. Such a lignin degradation step facilitates subsequent compression of the veneer without breaking cells or fracturing the lignin. In some examples, a portion of the lignin can also be removed from the veneer in the first step. In other examples, significant amounts of lignin are not removed from the veneer in the first step. In some examples, the loading solution comprises water and the veneer is heated to a temperature greater than about 50° C. after treatment with the loading solution.

In a second step, the treated veneer is at least partially dried.

In a third step, the treated veneer is infiltrated with a water blocking agent. The dry mass of the infiltrated water blocking agent is about 1-50% of the dry mass of the veneer. Preferably, cells throughout the entire cross section of the veneer absorb some amount of the water blocking agent. Most preferably, cells throughout the entire cross section of the veneer absorb a similar level of the water blocking agent, with said absorption occurring predominantly in the amorphous cellulose and hemicellulose regions of the wood cell walls. The dry mass of the infiltrated water blocking agent can be about 1-20% of the dry mass of the wood.

In a fourth step, the treated veneer is partially dried a second time. In some examples, the treated veneer is dried gently in a manner that does not cure the water blocking agent.

In a fifth step, the treated veneer is maintained within a first temperature range of about 20-50° C. and is subjected to sustained pressure of about 100-1,200 psi along an axis parallel to the thickness direction of the veneer until the density of the veneer has increased to a first target density range. In some examples, the first target density range can be a density of about 900-1,100 kg/m$^3$ without fully curing the water blocking agent. The moisture content range of the compressed veneer can be about 5-50%.

In a sixth step, the treated veneer is dried to reduce the moisture content to a second moisture content range of about 1-10%. In some examples, the treated veneer is dried without fully curing the water blocking agent.

In a seventh step, the treated wood is maintained within a second temperature range of about 20-150° C. and is subjected to sustained pressure along an axis parallel to the thickness direction of the veneer until the density of the treated veneer has increased to a second target density range. In some examples, the second target density range can be a density of about 950-1,400 kg/m$^3$. In some examples, upon achieving the second density range, the water blocking agent within the wood is fully cured. Wood subjected to all seven steps is dimensionally stable and can have a flexural modulus in the longitudinal axis in the range of about 6,000,000-8,000,000 psi (about 41-55 GPa).

In some examples, the water blocking agent in the cell walls of the treated wood can be cured after the fifth process step, such that steps six and seven are omitted. This approach can result in dimensionally stable wood products that have density values of about 900-1,250 kg/m$^3$ and a modulus of about 25-40 GPa. In this example the temperature of the wood in the fifth step can be in the range of about 20-150° C.

In some examples, the third step is omitted from the process, that is, the treatment with a water blocking agent may be omitted. In such examples, the partially dried veneer is dried a second time without treatment with a water blocking agent.

Wood suitable for use as a starting material for this disclosure includes pine, poplar, fir, aspen, oak, maple, cherry, apple, balsa, basswood, Japanese cedar, *eucalyptus*, and others. In some examples, grasses, such as bamboo, can be used in place of wood. In some examples, materials from different kinds of wood may be treated together.

Veneer wood sections can have an initial thickness that is less than about 0.25". Sections of wood with a thickness of about 0.25" to 0.06" are preferred due to their ability to uniformly absorb aqueous loading solutions, such as sodium hydroxide, or other aqueous solutions, including aqueous solutions of water blocking agents, throughout the cross-section of the wood during the first and third steps of the process.

Loading solutions can comprise chemicals that are known to degrade lignin or modify lignin in other manners, such that the resulting treated wood can be subsequently compressed to levels that achieve a density that is greater than about 950 kg/m$^3$ without breaking cells or fracturing the lignin in the middle lamella of the wood tissue. Loading solutions can also facilitate rapid compression of the wood. Loading solutions can include aqueous solutions of sodium hydroxide. These solutions can be aqueous solutions of sodium hydroxide in concentrations between about 0.1-15.0%. Loading solutions can also comprise sodium sulfite and oxidizing agents, such as ozone, oxygen, hydrogen peroxide, and organic peroxides, or combinations thereof. Loading solutions can also comprise amines. Preferred amines can include non-volatile, low-molecular-weight amines such as ethanolamine, diethanolamine, triethanolamine, and hydroxylamine. Loading solutions can be water-based.

Veneer can be submerged in loading solution. In some examples, the submerged veneer can be subjected to one or more vacuum cycles to facilitate absorption of the loading solution into the veneer. Specifically, veneer sections can be placed into a rigid chamber along with loading solution, such that the veneer sections are submerged within the loading solution. A valve in the chamber can then be opened and a portion of the air within the headspace of the chamber can be removed from the chamber by use of a vacuum. Under vacuum conditions, air within the veneer sections is displaced with aqueous loading solution at a rate that is faster than that which would otherwise be achieved in the absence of the vacuum. Additionally, or alternatively, the submerged veneer can be subjected to positive pressure, such as a pressure of 5-15 bar. Specifically, veneer sections can be placed into a rigid chamber along with loading solution, such that the veneer sections are submerged within the loading solution. A valve in the chamber can then be opened and additional air can be discharged into the headspace of the chamber. Under positive pressure conditions, the aqueous loading solution absorbs into the veneer sections at a rate that is faster than that which would otherwise be achieved in the absence of the positive pressure.

During the process of submerging the veneer in aqueous loading solution, the moisture content of the veneer can be increased from a first moisture content of about 1-20% to a second moisture content of about 20-100% (dry basis moisture content). This process can occur at a temperature between 20-200° C. The duration of the loading process can range from about 30 minutes to more than 12 hours, including durations of 60 minutes, 90 minutes, 120 minutes, 240 minutes, 360 minutes, 480 minutes, 600 minutes, 720 minutes, or more than 720 minutes. In some examples, these durations may be considered a minimum exposure time (that is, greater times may optionally be used). The time required depends upon the dimensions of the veneer, the wood species, the composition of the loading solution, the temperature of the loading solution, and the use of vacuum and/or pressure. In general, the active agent or agents in the loading solution should be distributed throughout the cross-section of the veneer at the completion of this step. In some examples, the active agent or agents in the loading solution can be distributed throughout the cross-section of the veneer in a manner that is relatively uniform. In some cases, the distribution of the loading solution in the veneer might not be uniform, but the distribution will be sufficient to achieve the desired effect of improved compression of the veneer in subsequent steps of the process.

After absorbing the loading solution, the treated veneer can be subjected to heat and pressure within a vessel, such as a pressure vessel. The temperature can be in the range of about 20-200° C. The pressure can be in the range of about 1-8 bar. Higher pressure is required when the temperature is sufficiently high to result in significant water vapor pressure. For instance, the loaded veneer can be subjected to about 5-6 bar and a temperature of about 150-200° C. for a period of about 1-5 hours. Under these conditions, reactions can occur between the active agent or agents in the loading solution and the lignin such that the lignin is partially degraded or otherwise modified in a manner that promotes softening of the wood, especially at elevated temperature. Partial degradation generally involves reducing the molecular weight of the lignin, but not to the point that the lignin becomes water-soluble. In some examples, the temperature of the loaded wood can be adjusted to either increase or decrease the amount of degraded lignin in the wood to achieve a level that is beneficial for subsequent compression steps. Temperature values associated with this process can range between about 60-200° C. In some examples, the active agent or agents in the loading solution degrade or otherwise modify both lignin and hemicellulose in the wood. The time required for this step can be empirically optimized by assessing the rate of compression in subsequent compression steps. Once the target level of modification has occurred, the veneer within the pressure vessel will be cooled to a temperature of about 20° C. and the pressure on the veneer can be reduced to about 1 bar. In some examples, the treated and conditioned veneer is soaked or extracted in water to remove lignin that was inadvertently degraded to the point of becoming water-soluble.

The moisture content of the treated veneer with modified lignin can then be reduced. In some examples, the moisture content of the treated veneer can be reduced to about 10-20% with gentle drying conditions prior to subsequent treatment steps. Drying can be accomplished by use of a kiln or oven. Alternatively, drying can be accomplished by placing the treated veneer into a chamber and subsequently reducing the pressure within the chamber. In some examples, the treated veneer can be restrained in a manner that prevents dimensional distortion during the drying process. Partial drying of the treated veneer can help to facilitate absorption of the water blocking agent in the subsequent treatment step.

Water blocking agents can include hydrophilic reactive monomers, hydrophobic reactive monomers, waxes, paper sizing agents, drying oils, topical sealants, coatings, and other materials that inhibit water absorption in the treated wood, or combinations thereof. A particularly advantageous class of water blocking agents is the hydrophilic reactive monomer. An example class of hydrophilic reactive monomers is methylolated phenols. Another example class of hydrophilic reactive monomers is methylolated substituted phenols, such as methylolated cresol. An example class of hydrophobic reactive monomers is isocyanates.

The treated and infiltrated veneer can then be subjected to a first compression step. In some examples, the treated and infiltrated veneer can be loaded into a press, wherein the top and bottom platens of the press have a temperature in the range of about 20-150° C. The treated and infiltrated veneer can be oriented in the press such that the thickness axis of the veneer is orthogonal to the contacting surface of the platens. The pressure applied to the treated and infiltrated veneer can be increased from 0 to about 3-8 MPa over a period of 0-10 minutes. The applied pressure can then be sustained until the treated and infiltrated veneer has been compressed to about 40-50% of the original thickness. The density of the treated and infiltrated veneer at this point can be about 900-1,100 kg/m$^3$. This compression process can take about 5-100 minutes depending on the original thickness of the treated and infiltrated veneer, the applied pressure, the temperature of the platens, the wood species, and other factors including those related to the first step in the process. The pressure applied to the treated and infiltrated veneer can then be relieved, and the treated, infiltrated, and compressed veneer can thereafter be removed from the press. In some examples, it can be beneficial for the temperature of the platens to be in the range of about 20-60° C. for the first compression step. The lower temperature can help to ensure that the absorbed water blocking agent does not cure during this step. Compression at these lower temperature values can be facilitated by partial degradation of the lignin (and/or hemicellulose) during the first stage of the manufacturing process, which involves treatment of the veneer with a loading solution and subsequent heating.

The section of treated, infiltrated, and compressed veneer can then be subjected to a second drying step. In some examples, the treated, infiltrated, and compressed veneer can be dried to a moisture content of about 1-10%. Drying can be accomplished by use of a kiln or oven. Alternatively, drying can be accomplished in a chamber that operates under reduced pressure. In some examples, the treated, infiltrated, and compressed veneer can be restrained in a manner that prevents dimensional distortion (warping or twisting) during the drying process. Drying under reduced pressure at low temperature can be preferred to ensure that the absorbed water blocking agent does not cure during the drying process in this step.

The treated, infiltrated, compressed, and dried veneer can then be subjected to a second compression step. The treated, infiltrated, compressed, and dried veneer can be loaded into a press, wherein the top and bottom platens of the press have a temperature in the range of about 20-150° C. The veneer can be oriented in the press such that the thickness axis of the veneer is orthogonal to the contacting surface of the platens. The pressure applied to the treated, infiltrated, compressed, and dried veneer can be increased from 0 to about 3-10 MPa over a period of 0-10 minutes. The applied pressure can then be sustained until the treated, infiltrated, compressed, and dried veneer has been compressed to a level that corresponds to a density of about 1,100-1,400 kg/m$^3$. In some examples, the density of the treated, infiltrated, compressed, and dried veneer can be increased to a value that is greater than about 1,300 kg/m$^3$. In some examples, the density of the treated, infiltrated, compressed, and dried veneer can be increased to a value that is greater than about 1,350 kg/m$^3$. This second compression process can take about 2-40 minutes depending on the original thickness of the veneer, the applied pressure, the temperature of the platens, the wood species, and other factors including those related to the first step in the process. In some examples, after complete compression of the veneer has been achieved, the water blocking agent in the treated, infiltrated, and compressed veneer can be cured or otherwise converted into a polymerized state such it is not soluble in water. An objective of this technology is for the water blocking agent to cure after the treated, infiltrated, compressed, and dried veneer has achieved the final compression target. In some examples, the water blocking agent can be cured before the pressure on the treated, infiltrated, compressed, and dried veneer has been relieved. In some examples, the water blocking agent can be cured after the pressure on the treated, infiltrated, compressed, and dried veneer has been relieved. For example, the treated, infiltrated, compressed, and dried veneer can be fully compressed to a density range of about 1,200-1,400 kg/m$^3$ and the treated, infiltrated, compressed, and dried veneer has been removed from the press and transferred to a kiln or oven to cure the absorbed water blocking agent. In some examples, the treated, infiltrated, compressed, and dried veneer can be restrained in the kiln or oven to prevent the formation of geometric defects, such as twist or warpage.

Treated, infiltrated, and compressed veneer that has been produced in accordance with the disclosure can exhibit improved dimensional stability when exposed to water. The amount of swelling along the thickness axis can be greatly reduced by use of the water blocking agent. In some examples, the amount of swelling along the thickness axis can be less than about 5% by use of the water blocking agent.

The veneer products and veneer-based strand products produced in accordance with the methods disclosed herein may thus achieve a non-normal distribution (that is, a truncated distribution) of properties, with low value outliers avoided through the use of the methods disclosed herein.

The veneer products and veneer-based strand products produced in accordance with the methods disclosed herein may thereby meet or exceed target property values. In some examples, the average parallel-to-grain direction bending modulus of the veneer products and veneer-based strand products can be at least $1.8\times10^6$ psi, at least $2.0\times10^6$ psi, at least $2.2\times10^6$ psi, or at least $2.4\times10^6$ psi. In some examples, the minimum parallel-to-grain direction bending modulus of the veneer products and veneer-based strand products can be at least $1.8\times10^6$ psi, at least $2.0\times10^6$ psi, at least $2.2\times10^6$ psi, or at least $2.4\times10^6$ psi. In some examples, the average density of the veneer products and veneer-based strand products can be at least 800 kg/m$^3$, at least 1,000 kg/m$^3$, at least 1,200 kg/m$^3$, or at least 1,400 kg/m$^3$. In some examples, the minimum density of the veneer products and veneer-based strand products can be at least 800 kg/m$^3$, at least 1,000 kg/m$^3$, at least 1,200 kg/m$^3$, or at least 1,400 kg/m$^3$.

According to some aspects of the disclosure, the veneer product produced in accordance with the methods disclosed herein can be used in a variety of products. In some examples, the product can be a composite comprising one or more veneer layers produced according to the methods disclosed herein. In some examples, the product can be a plywood product comprising two or more veneer layers produced according to the methods disclosed herein. In some examples, the product can be an I-joist, which has a central web section and outer top and bottom flange sections. In such examples, the flange sections can comprise veneer layers produced according to the methods disclosed herein.

According to some aspects of the disclosure improved veneer-based strands produced in accordance with the methods disclosed herein can be used in a variety of products. In some examples, the product can be an oriented strandboard product comprising veneer-based strands produced according to the methods disclosed herein. In some examples, the product can be a parallel strand lumber product comprising veneer-based strands produced according to the methods disclosed herein. In some examples, the product can be a laminated strand lumber product comprising veneer-based strands produced according to the methods disclosed herein.

Working Examples of the Disclosed Technology

In a comparative example, eight small samples of natural yellow poplar veneer were measured for flexural modulus in the longitudinal direction. See Table 1. Likewise, four small samples yellow poplar veneer, from the same population as that of the control group, were subjected to the disclosed veneer modification process and were then measured for flexural modulus in the longitudinal direction. See Table 2. Flexural modulus values were determined using the ASTM D1037 method.

TABLE 1

Flexural Modulus and Associated Parameters for the Natural Yellow Poplar Group

| Veneer Sample | Veneer Thickness (mm) | Veneer Width (mm) | Span (mm) | Slope of Center Point Load/ Displacement (kN/mm) | Calculated Flexural Modulus (GPa) | Calculated Flexural Modulus (psi) |
|---|---|---|---|---|---|---|
| 1 | 4.22 | 37.86 | 100.0 | 0.1380 | 12.1 | 1.76E+06 |
| 2 | 4.19 | 37.82 | 100.0 | 0.1281 | 11.5 | 1.67E+06 |
| 3 | 4.17 | 37.82 | 100.0 | 0.1078 | 9.8 | 1.43E+06 |
| 4 | 4.25 | 37.82 | 100.0 | 0.1461 | 12.6 | 1.82E+06 |
| 5 | 4.19 | 37.82 | 100.0 | 0.1316 | 11.8 | 1.72E+06 |
| 6 | 4.16 | 37.83 | 100.0 | 0.1243 | 11.4 | 1.65E+06 |
| 7 | 4.18 | 37.85 | 100.0 | 0.1330 | 12.0 | 1.74E+06 |
| 8 | 4.24 | 37.80 | 100.0 | 0.1465 | 12.7 | 1.84E+06 |
| Average | | | | | 11.8 | 1.70E+06 |
| Standard Deviation | | | | | 0.845 | 1.23E+05 |

TABLE 2

Flexural Modulus and Associated Parameters for the Modified Yellow Poplar Group

| Veneer Sample | Veneer Thickness (mm) | Veneer Width (mm) | Span (mm) | Slope of Center Point Load/ Displacement (kN/mm) | Calculated Flexural Modulus (GPa) | Calculated Flexural Modulus (psi) |
|---|---|---|---|---|---|---|
| 9 | 1.38 | 37.94 | 100.0 | 0.01885 | 47.3 | 6.85E+06 |
| 10 | 1.44 | 37.84 | 100.0 | 0.01964 | 43.5 | 6.30E+06 |
| 11 | 1.46 | 37.84 | 100.0 | 0.02058 | 43.7 | 6.34E+06 |
| 12 | 1.46 | 37.91 | 100.0 | 0.02030 | 43.0 | 6.24E+06 |
| Average | | | | | 44.4 | 6.43E+06 |
| Standard Deviation | | | | | 1.742 | 2.53E+05 |

Assuming that the flexural modulus values in the natural yellow poplar group are normally distributed, then based on the data shown in Table 1, it is possible to calculate that 78.2% of the veneer samples in the natural yellow poplar population would have a flexural modulus value that is less than 1,800,000 psi.

In contrast, based on the data shown in Table 2, it is calculated that approximately 0.0% of the veneer samples in the modified yellow poplar population would have a flexural modulus value that is less than 1,800,000 psi. Thus, if the required flexural modulus value for veneer in an LVL application was 1,800,000 psi, then all of the veneer in this modified group would be suitable for use in structural LVL applications.

In some examples of the present disclosure, wooden elements such as sliced wood, strands, slats, particles, fibers, or other wooden elements can be subjected to the process described herein. In this manner different types of wooden element populations that have initial bending modulus properties wherein a portion of the population has unacceptable bending modulus values, and another portion of the population has acceptable bending modulus values, can be subjected to a process that efficiently transforms the entire population such that all wooden elements have acceptable bending modulus values.

Additional Examples of the Disclosed Technology

In view of the above-described implementations of the disclosed subject matter, this application discloses the additional examples enumerated below. It should be noted that one feature of an example in isolation or more than one feature of the example taken in combination and, optionally, in combination with one or more features of one or more further examples are further examples also falling within the disclosure of this application.

Example 1. A method comprising: subjecting a set of wooden veneer sections to non-destructive parallel-to-grain direction bending modulus measurements; sorting the veneer sections into a first group with modulus values above a predetermined threshold value and a second group with modulus values below the threshold value; and subjecting the second group of veneer sections to a process that increases the parallel-to-grain direction bending modulus value to that which is greater than the predetermined threshold value.

Example 2. The method of any example herein, especially example 1, wherein the process that increases the parallel-to-grain direction bending modulus value comprises a lignin degradation step, and a compression step.

Example 3. The method of any example herein, especially example 1, wherein the process used to increase the parallel-to-grain direction bending modulus value comprises: infiltrating veneer with a loading solution to produce a treated veneer; infiltrating the treated veneer with a water blocking agent; compressing the treated veneer along a thickness axis until a density of the treated veneer is in a first density range; reducing a moisture content of the treated veneer to a range of about 1-10%; and compressing the treated veneer along the thickness axis until the density of the treated veneer is in a second density range.

Example 4. The method of any example herein, especially example 3, wherein the loading solution is sodium hydroxide, sodium sulfite, or a combination thereof.

Example 5. The method of any example herein, especially example 3, wherein the loading solution is a non-volatile amine, including ethanolamine, diethanolamine, triethanolamine, and hydroxylamine, or a combination thereof.

Example 6. The method of any example herein, especially example 3, wherein the water blocking agent is a hydrophilic, reactive monomer, including methylolated phenol, methylolated substituted phenols, including methylolated cresol, or a combination thereof.

Example 7. The method of any example herein, especially example 3, wherein the water blocking agent is an isocyanate.

Example 8. The method of any example herein, especially example 3, wherein the first density range is about 900-1,200 $kg/m^3$.

Example 9. The method of any example herein, especially example 3, wherein the second density range is about 1,200-1,400 $kg/m^3$.

Example 10. The method of any example herein, especially example 3, wherein the parallel-to-grain direction bending modulus in a long axis of the treated veneer is about 14-50 GPa.

Example 11. The method of any example herein, especially example 1, wherein the process used to increase the parallel-to-grain direction bending modulus value comprises: infiltrating veneer with a loading solution to form a treated veneer; reducing a moisture content of the treated veneer to a range of about 1-20%; and compressing the treated veneer along a thickness axis until a density of the treated veneer is in a target density range.

Example 12. The method of any example herein, especially example 11, wherein the loading solution is sodium hydroxide, sodium sulfite or a combination thereof.

Example 13. The method of any example herein, especially example 11, wherein the loading solution is a non-volatile amine, including ethanolamine, diethanolamine, triethanolamine, hydroxylamine, or a combination thereof.

Example 14. The method of any example herein, especially example 11, wherein the target density range is about 800-1,400 $kg/m^3$.

Example 15. The method of any example herein, especially example 11, wherein the parallel-to-grain direction bending modulus in a long axis of the treated veneer is about 14-50 GPa.

Example 16. The method of any example herein, especially example 1, wherein the threshold value is greater than about $1.8\times10^6$ psi.

Example 17. The method of any example herein, especially example 1, wherein the threshold value is greater than about $2.0\times10^6$ psi.

Example 18. The method of any example herein, especially example 1, wherein the threshold value is greater than about $2.2\times10^6$ psi.

Example 19. The method of any example herein, especially example 1, wherein the threshold value is greater than about $2.4\times10^6$ psi.

Example 20. A composite comprising material produced by the method of any example herein, especially example 1.

Example 21. A composite comprising two or more veneer layers, wherein one or more of the veneer layers are derived from a conventional veneer manufacturing process; and wherein one or more of the veneer layers are a product of a process used to increase a parallel-to-grain direction bending modulus value of the veneer layers comprising a lignin degradation step and a compression step.

Example 22. An I-joist with a central web section and outer top and bottom flange sections, wherein the flange sections are comprised of laminated veneer lumber, wherein one or more veneer layers that are most distal to the web are a product of a process used to increase a parallel-to-grain direction bending modulus value of the one or more veneer layers comprising a lignin degradation step and a compression step.

Example 23. A composite comprising two or more veneer layers, wherein all of the veneer layers are a product of a process used to increase a parallel-to-grain direction bending modulus value of the veneer layer comprising a lignin degradation step and a compression step.

Example 24. A system comprising a population of veneer sheets having a non-normal, truncated distribution of bending modulus values such that all veneer sheets in the population have bending modulus values that exceed a predetermined bending modulus threshold value of $1.8\times10^6$ psi.

Example 25. A plywood product comprising two or more veneer layers, at least one of the veneer layers is derived from a conventional veneer manufacturing process; and wherein at least one of the veneer layers is a product of a process used to increase a parallel-to-grain direction bending modulus value of the veneer layers comprising a lignin degradation step and a compression step.

Example 26. A plywood product comprising a plurality of veneer layers, wherein all of the veneer layers are a product of a process used to increase a parallel-to-grain direction bending modulus value of the veneer layer comprising a lignin degradation step and a compression step.

Example 27. A parallel strand lumber product comprising a plurality of veneer-based strands, wherein at least 1% by weight of the veneer-based strands are derived from a conventional veneer manufacturing process; and wherein at least 1% by weight of the veneer-based strands are a product of a process used to increase a parallel-to-grain direction bending modulus value of the veneer-based strands comprising a lignin degradation step and a compression step.

Example 28. A parallel strand lumber product comprising a plurality of veneer-based strands, wherein all of the veneer-based strands are a product of a process used to increase a parallel-to-grain direction bending modulus value of the veneer-based strands comprising a lignin degradation step and a compression step.

Example 29. A laminated strand lumber product comprising a plurality of strands, wherein at least 1% by weight of the strands are derived from a conventional strand manufacturing process; and wherein at least 1% by weight of the strands are a product of a process used to increase a parallel-to-grain direction bending modulus value of the strands comprising a lignin degradation step and a compression step.

Example 30. A laminated strand lumber product comprising a plurality of strands, wherein all of the strands are the product of a process used to increase a parallel-to-grain direction bending modulus value of the strands comprising a lignin degradation step and a compression step.

Example 31. An oriented strandboard product comprising a plurality of strands, wherein at least 1% by weight of the strands are derived from a conventional strand manufacturing process; and wherein at least 1% by weight of the strands are the product of a process used to increase a parallel-to-grain direction bending modulus value of the strands comprising a lignin degradation step and a compression step.

Example 32. An oriented strandboard product comprising a plurality of strands, wherein all of the strands are the product of a process used to increase a parallel-to-grain direction bending modulus value of the strands, comprising a lignin degradation step and a compression step.

Example 33. A method of construction, wherein composite products are used; wherein the composite products comprise veneer that is a product of a process used to increase a parallel-to-grain direction bending modulus value of the veneer comprising a lignin degradation step and a compression step; and wherein the composite products allow for the use of increased spacing between structural members in a building.

Example 34. A method of construction, wherein composite products are used; wherein the composite products comprise veneer that is a product of a process used to increase a parallel-to-grain direction bending modulus value of the veneer comprising a lignin degradation step and a compression step and wherein the composite products allow for the use of reduced floor thickness in a building.

Example 35. A method of improving mechanical properties of wood veneer, comprising infiltrating the wood veneer with a loading solution to produce a treated veneer; partially drying the treated veneer a first time; infiltrating the treated veneer with a water blocking agent; partially drying the treated veneer a second time; holding the treated veneer at a temperature ranging from 20-50° C. and at a pressure ranging from 100-1200 psi until a density of the treated veneer ranges from 900-1,100 kg/m$^3$ without fully curing the water blocking agent; drying the treated veneer until the moisture content ranges from between 1% and 10%.

In view of the many possible ways in which the principles of the disclosure may be applied, it should be recognized that the illustrated configurations depict examples of the disclosed technology and should not be taken as limiting the scope of the disclosure nor the claims. Rather, the scope of the claimed subject matter is defined by the following claims and their equivalents.

We claim:

1. A method comprising:

(a) subjecting veneer sections to non-destructive parallel-to-grain direction bending modulus measurements;

(b) sorting the veneer sections into a first group comprising veneer sections having a first group modulus value above a predetermined threshold value and a second group comprising veneer sections having a second group modulus value below the predetermined threshold value;

(c) subjecting the second group of veneer sections to a process that increases the second group modulus value for parallel-to-grain direction bending above the predetermined threshold value; and (d) after (c), fabricating a structural wood composite from at least one of the veneer sections of the first group and at least one of the veneer sections of the second group, wherein each veneer section in the structural wood composite has a modulus value above the predetermined threshold value.

2. The method of claim 1, wherein the process that increases the second group modulus value for parallel-to-grain direction bending comprises:

subjecting each veneer section of the second group to a treatment that at least partially degrades lignin within the respective veneer section and after the treatment, compressing each veneer section along a thickness axis thereof without breaking cells or fracturing the lignin therein.

3. The method of claim 1, wherein the process used to increase the parallel-to-grain direction bending modulus value in (c) comprises:

(c1) infiltrating the second group of veneer sections with a loading solution to produce treated veneer sections;

(c2) after (c1), infiltrating the treated veneer sections with a water blocking agent;

(c3) after (c2), compressing the treated veneer sections along a thickness axis until a density densities of the treated veneer sections are in a first density range;

(c4) after (c3), reducing a moisture content of the treated veneer sections to a range of about 1-10%; and (c5) after (c4), further compressing the treated veneer sections along the thickness axis until the densities of the treated veneer sections are in a second density range, wherein the density of each treated veneer section resulting from (c3) is less than the density of the corresponding veneer section resulting from (c5).

4. The method of claim 3, wherein the loading solution is sodium hydroxide, sodium sulfite, or a combination thereof.

5. The method of claim 3, wherein the loading solution is a non-volatile amine.

6. The method of claim 3, wherein the water blocking agent is a hydrophilic, reactive monomer.

7. The method of claim 3, wherein the water blocking agent is an isocyanate.

8. The method of claim 3, wherein the first density range is about 900-1,200 kg/m$^3$.

9. The method of claim 3, wherein the second density range is about 1,200-1,400 kg/m$^3$.

10. The method of claim 3, wherein the parallel-to-grain direction bending modulus in a long axis of the treated veneer sections is about 14-50 GPa.

11. The method of claim 1, wherein the process used to increase second group bending modulus for parallel-to-grain direction bending in (c) comprises:

(c1) infiltrating the second group of veneer sections with a loading solution to form treated veneer sections;

(c2) after (c1), reducing a moisture content of the treated veneer sections to a range of about 1-20%; and (c3) after (c2), compressing the treated veneer sections along a thickness axis until a density of the treated veneer sections is in a target density range.

12. The method of claim 11, wherein the loading solution is sodium hydroxide, sodium sulfite, or a combination thereof.

13. The method of claim 11, wherein the loading solution is a non-volatile amine.

14. The method of claim 11, wherein the target density range is about 800-1,400 kg/m$^3$.

15. The method of claim 11, wherein the bending modulus for parallel-to-grain direction bending in a long axis of the treated veneer sections is about 14-50 GPa.

16. The method of claim 1, wherein the predetermined threshold value is greater than about $1.8\times10^6$ psi.

17. The method of claim 1, wherein the predetermined threshold value is greater than about $2.0\times10^6$ psi.

18. The method of claim 1, wherein the predetermined threshold value is greater than about $2.2\times10^6$ psi.

19. The method of claim 1, wherein the predetermined threshold value is greater than about $2.4\times10^6$ psi.

20. The method of claim 3, wherein the loading solution comprises ethanolamine, diethanolamine, triethanolamine, hydroxylamine, or any combination of the foregoing.

21. The method of claim 3, wherein the water blocking agent comprises methylolated phenol, methylolated substituted phenols, methylolated cresol, or any combination of the foregoing.

22. The method of claim 11, wherein the loading solution comprises ethanolamine, diethanolamine, triethanolamine, hydroxylamine, or any combination of the foregoing.

23. The method of claim 3, wherein:

after (c3) and prior to (c5), the water blocking agent in each treated veneer section remains at least partially uncured; and after (c5), the water blocking agent in each treated veneer section is substantially cured.

24. A method comprising:

providing a plurality of first veneer sections and a plurality of second veneer sections, each first veneer section having a bending modulus greater than a predetermined threshold value, each second veneer section having a bending modulus less than a predetermined threshold value;

densifying the plurality of second veneers sections to form a plurality of upgraded veneer sections, each upgraded veneer section having an improved bending modulus greater than the predetermined threshold value; and assembling one or more of the upgraded veneer sections with one or more of the first veneer sections to form a structural wood composite.

25. The method of claim 24, wherein the densifying comprises:

subjecting the plurality of second veneer sections to a treatment that at least partially degrades or modifies lignin within the respective second veneer section; and after the treatment, compressing each second veneer section along a thickness axis thereof.

26. The method of claim 25, further comprising:

after the treatment and prior to the compressing, infiltrating each second veneer section with a water blocking agent, wherein the water blocking agent comprises methylolated phenol, methylolated substituted phenols, methylolated cresol, or any combination of the foregoing.

27. The method of claim 25, wherein:

the compressing comprises first and second compression stages separated by an intermediate drying stage that reduces a moisture content of the second veneer sections;

densities of the second veneer sections after the first compression stage are in a range of 900-1200 $kg/m^3$; and the densities of the second veneer sections after the second compression stage are in a range of 1200-1400 $kg/m^3$.

28. The method of claim 24, wherein the structural wood composite is formed of the one or more upgraded veneer sections, the one or more first veneer sections, and a structural adhesive.

* * * * *